(12) United States Patent
Kryskow, Jr. et al.

(10) Patent No.: US 7,260,627 B2
(45) Date of Patent: Aug. 21, 2007

(54) REAL TIME MESH MEASUREMENT SYSTEM STREAM LATENCY AND JITTER MEASUREMENTS

(75) Inventors: Joseph M. Kryskow, Jr., Hudson, NH (US); Richard E. Hudnall, Nashua, NH (US)

(73) Assignee: Infrastructure Innovations, LLC, Boston, MA (US)

( * ) Notice: Subject to any disclaimer, the term of this patent is extended or adjusted under 35 U.S.C. 154(b) by 745 days.

(21) Appl. No.: 10/222,211

(22) Filed: Aug. 16, 2002

(65) Prior Publication Data

US 2003/0065769 A1 Apr. 3, 2003

Related U.S. Application Data

(63) Continuation of application No. PCT/US01/05120, filed on Feb. 16, 2001.

(60) Provisional application No. 60/183,700, filed on Feb. 18, 2000.

(51) Int. Cl.
*G06F 15/16* (2006.01)

(52) U.S. Cl. .................. 709/224; 709/232; 370/231

(58) Field of Classification Search ........ 709/223–224, 709/238, 232–235; 370/229, 503, 231–235
See application file for complete search history.

(56) References Cited

U.S. PATENT DOCUMENTS

| | | | | |
|---|---|---|---|---|
| 5,535,193 A | * | 7/1996 | Zhang et al. | 370/253 |
| 5,557,748 A | | 9/1996 | Norris | |
| 5,775,996 A | | 7/1998 | Othmer et al. | |
| 5,805,602 A | * | 9/1998 | Cloutier et al. | 370/516 |
| 5,944,840 A | | 8/1999 | Lever | |
| 6,012,096 A | * | 1/2000 | Link et al. | 709/233 |
| 6,052,363 A | * | 4/2000 | Koch | 370/252 |
| 6,134,531 A | * | 10/2000 | Trewitt et al. | 705/10 |
| 6,175,872 B1 | * | 1/2001 | Neumann et al. | 709/231 |
| 6,286,004 B1 | * | 9/2001 | Yoshiura et al. | 707/10 |
| 6,393,126 B1 | * | 5/2002 | van der Kaay et al. | 380/241 |
| 6,535,892 B1 | * | 3/2003 | LaRue et al. | 707/203 |
| 6,560,648 B1 | * | 5/2003 | Dunn et al. | 709/224 |
| 6,662,223 B1 | * | 12/2003 | Zhang et al. | 709/224 |
| 6,665,317 B1 | * | 12/2003 | Scott | 370/516 |
| 6,801,939 B1 | * | 10/2004 | Chafe | 709/224 |
| 6,922,417 B2 | * | 7/2005 | Vanlint | 370/503 |
| 6,970,424 B2 | * | 11/2005 | Fawaz et al. | 370/232 |
| 2002/0037732 A1 | * | 3/2002 | Gous et al. | 455/502 |
| 2002/0105911 A1 | * | 8/2002 | Pruthi et al. | 370/241 |
| 2005/0007952 A1 | * | 1/2005 | Scott | 370/229 |
| 2005/0058149 A1 | * | 3/2005 | Howe | 370/428 |

* cited by examiner

*Primary Examiner*—Abdullahi Salad
(74) *Attorney, Agent, or Firm*—Alfred A. Fressola; Ware, Fressola, Van Der Sluys & Adolphson LLP

(57) ABSTRACT

A method is described for measuring system latency and latency jitter on a near real-time basis regarding packets of information moving from sources to destination. The method for measuring system latency and latency jitter includes time-stamping packets of information as they pass through a plurality of locations between the source and destination of these packets, with the time-stamping being performed by real-time clocks set to a universal standard. The time-stamped packets are analyzed to determine latency and latency jitter. The measurements of system latency and latency jitter can be performed based upon packet types so as to obtain accurate information concerning different types of business bandwidths associated with an observed network.

9 Claims, 18 Drawing Sheets

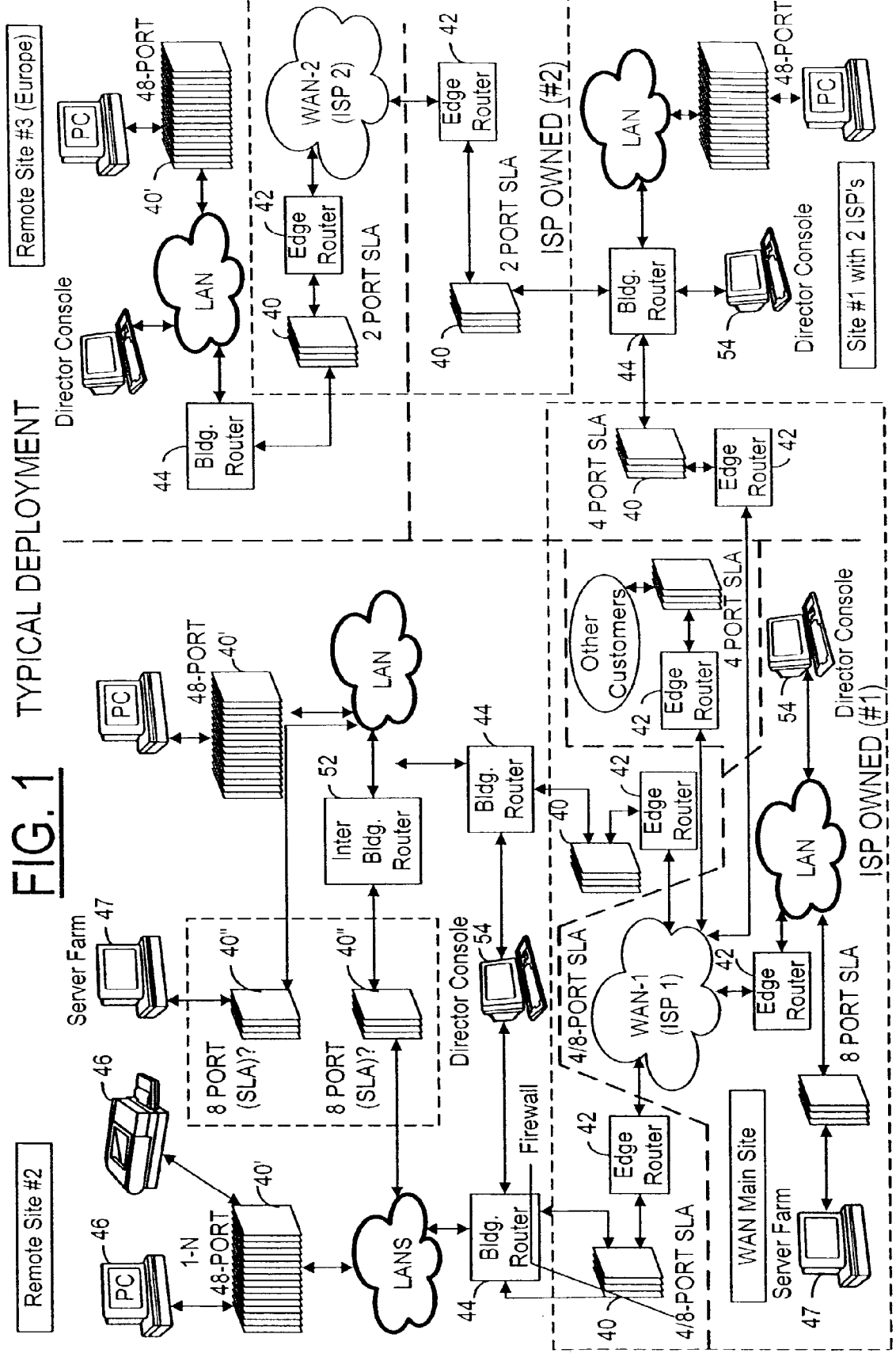
FIG. 1  TYPICAL DEPLOYMENT

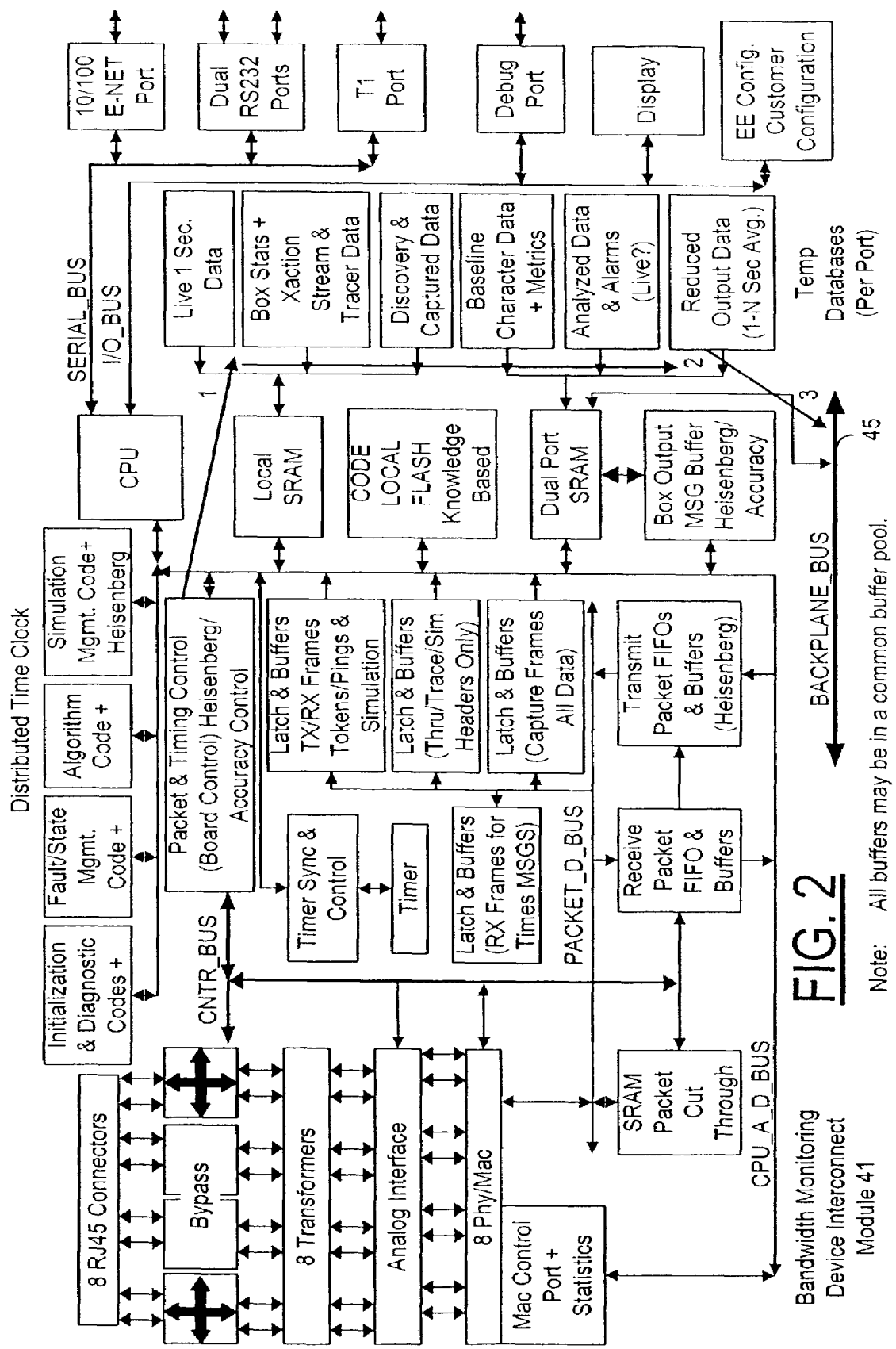

Note: All buffers may be in a common buffer pool.

REAL TIME MESH MEASUREMENT SYSTEM STREAM LATENCY AND JITTER MEASUREMENTS

CROSS REFERENCE TO RELATED APPLICATIONS

This application is a continuation of International Application No. PCT/US01/05120 having an international filing date of Feb. 16, 2001, and from which priority is claimed under all applicable sections of Title 35 of the United States Code including, but not limited to, Sections 120, 363 and 365(c), and which in turn claims priority under 35 USC 119(e) to U.S. Provisional Patent Application Ser. No. 60/183,700 filed on Feb. 18, 2000.

The present application discloses subject matter which is disclosed and may be claimed in the following United States applications as identified by application Ser. Nos. 10/223,067, 10/222,211, 10/222,193 and 10/222,210.

Application Ser. No. 10/223,067 is directed to a closed loop method for baselining business bandwidth in a network environment.

Application Ser. No. 10/222,211 is directed to analysis of business bandwidth for control of same Application Ser. No. 10/22,193 is directed to the application of closed loop control to control of business bandwidth.

Application Ser. No. 10/222,210 is an extension of 10/223,067, 10/222,190, 10/22,211 and 10/222,193 with respect to exportation of information in a multiple management environment (multiple users with different SLAs).

TECHNICAL FIELD

The present invention is directed to an implementation/method that identifies how to create a new measuring "sense" for measuring business bandwidth performance. This new "sense" is the ability to "see" (observe & measure) in real time business bandwidth latencies and the rate of change of the latency, known as latency jitter.

BACKGROUND OF THE INVENTION

In a networked environment, the length of time for packets to travel from a source to a destination can vary for many reasons, including delays due to routers, communication, media, and the like. Although attempts have been made to determine latency and latency jitter through use of remote monitoring devices (RMONSs) and the like, such efforts have generally been unsatisfactory. It is desirable to make such measures in an accurate and precise manner.

DISCLOSURE OF THE INVENTION

The present process is able to determine business bandwidth performance by determining real-time bandwidth latency and latency jitter. Observations are continuously and simultaneously made over the network in order to measure:
  Multiple end-to-end paths.
  Individual components that make up paths (those components that affect latency jitter).

This ability to continually and simultaneously measure latency (both end-to-end and for each component) allows the measurement "sense" to identify the specific component that may be causing latency jitter that exceeds thresholds and cause intermittent business bandwidth problems. Additionally, the ability to synchronize measurements taken from multiple tools/end points (and correlate/analyze in real time this information) is what is referred to as the Real Time Mesh Measurement System.

Definitions:
  Token: a single packet or packet train. It represents an application profile (such as two packets, a pause, then three more packets).
  Packet Train: a packet train simulates the traffic generated by specific applications.
  Tracer: the same as "marker".
  Marker: an inserted packet pair that frames (e.g., beginning and end) a stream of actual customer traffic).

The present invention defines a new type of network service monitoring and measurement system that can fully measure key performance characteristics of specific network service offerings, targeted for identifying specific customer utilization and performance metrics utilizing those specific services. This new monitoring system/method is primarily based on the ability to insert management traffic onto a specific customer service or a specific service provider's service channel. The two types of inserted traffic are:
  Tokens: tokens simulate different network traffic types.
  Markers/Tracers: these inserted packets frame (one at the beginning and one at the end) streams of network traffic for specific services and/or specific customers.

The key components necessary to enable this new monitoring service to utilize these inserted packets and fully capture the critical performance statistics are as follows:
  Multiple hardware modules (bandwidth monitoring devices) that can be deployed throughout the network (system) that can transmit and receive these tokens and tracers.
  A distributed time service that can accurately synchronize, time-stamp, and correlate the transmit and receive characteristics of the inserted traffic.
  A token building and distribution application that distributed configured/pre-defined tokens that will simulate customer/service traffic.
  Monitoring and performance assessment modules that can locally collect and aggregate these inserted packets and then analyze them to produce performance metrics (latency, jitter, dispersion, and gap analysis—packets within a token).
  Data collection and analysis modules that collect the raw and analyzed simulation data from multiple points and then perform further analysis to create additional performance metrics (delivery assurance, delivery reliability, effective bandwidth, and available bandwidth).

BRIEF DESCRIPTION OF THE FIGURES

FIG. 1 is an overall diagrammatic representation of a typical deployment environment of the present invention in which various networks are interconnected for providing bandwidth necessary for implementing one or more service level agreements.

THE BEST MODE FOR CARRYING OUT THE INVENTION

Figure 2A:
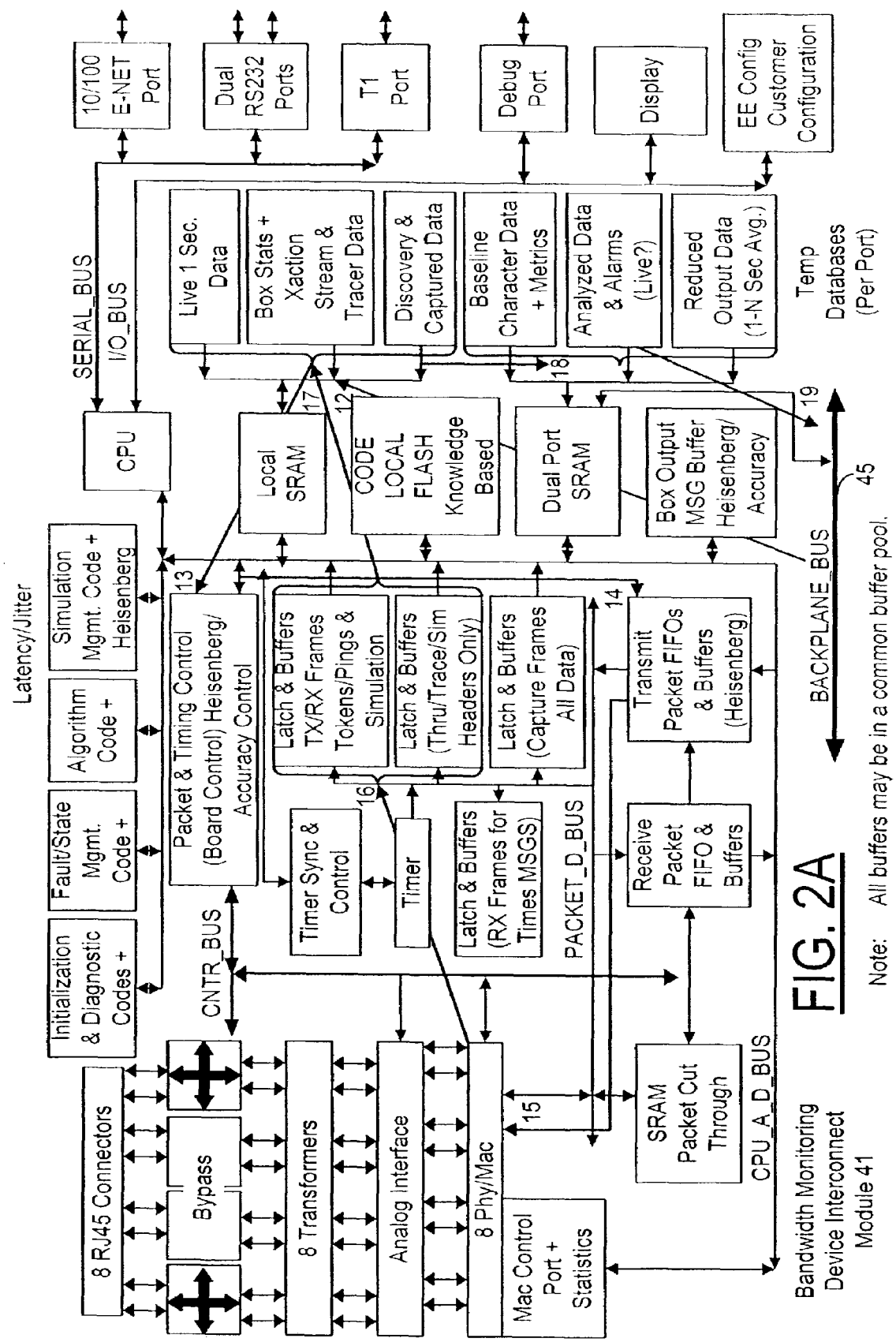
FIG. 2 is a block diagram of the bandwidth monitoring device interconnect module forming part of a bandwidth monitoring device.

As best seen in FIG. 1, a typical deployment of the present invention comprises a plurality of bandwidth monitoring devices 40, such as edge devices which are typically co-located with edge routers 42 and building routers 44. Edge routers (switch fabric) are typically deployed at the edge of one wide area network (WAN) associated with an internet service provider (ISP) or between a WAN and a local area network (LAN) as shown in FIG. 1. The edge devices (appliances) (bandwidth monitoring devices at the edge of different networks) are positioned so as to monitor bandwidth passing through an edge router typically to a building router 44 from whence the bandwidth is communicated through LANs, ultimately to one or more network enabled devices 46 such as PCs, printers and the like and/or to server farms 47. Depending upon the level of monitoring, a special type of bandwidth monitoring device such as a network enabled device bandwidth monitoring device 40 particularly suited for connection to network enabled devices 46 can be employed. Such monitoring devices typically are positioned between a LAN and a plurality of network enabled devices 46. In addition, server farm bandwidth monitoring devices 40 can be positioned between server farms 47 and LANs or interbuilding routers 52 as shown in FIG. 1.

Figure 3:
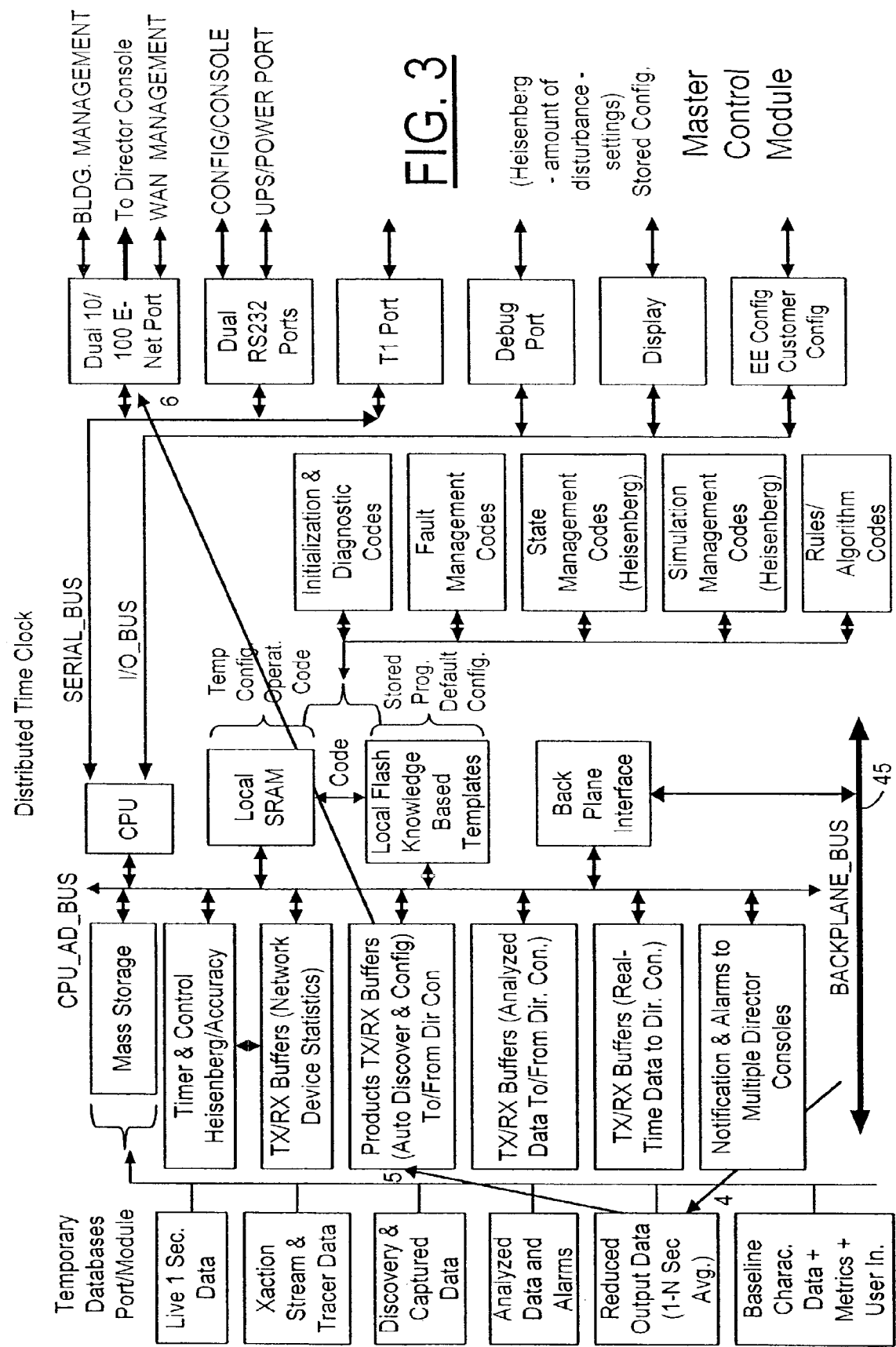
FIG. 3 is a block diagram of the master control module of the bandwidth monitoring device.
Figure 4:
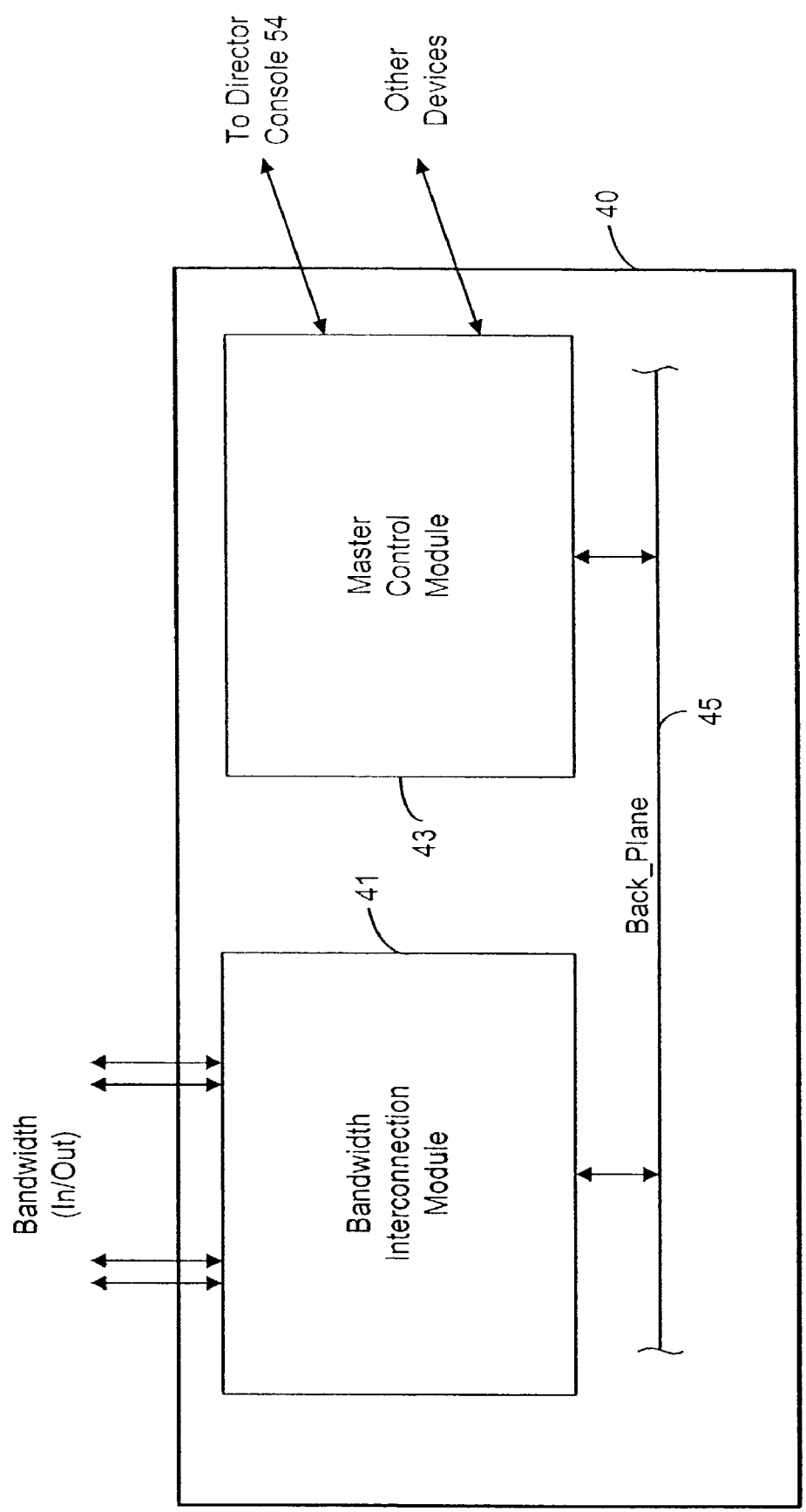
FIG. 4 is a block diagram showing how the bandwidth interconnect module and the master control module are put together to form the bandwidth monitoring device.
Figure 5:
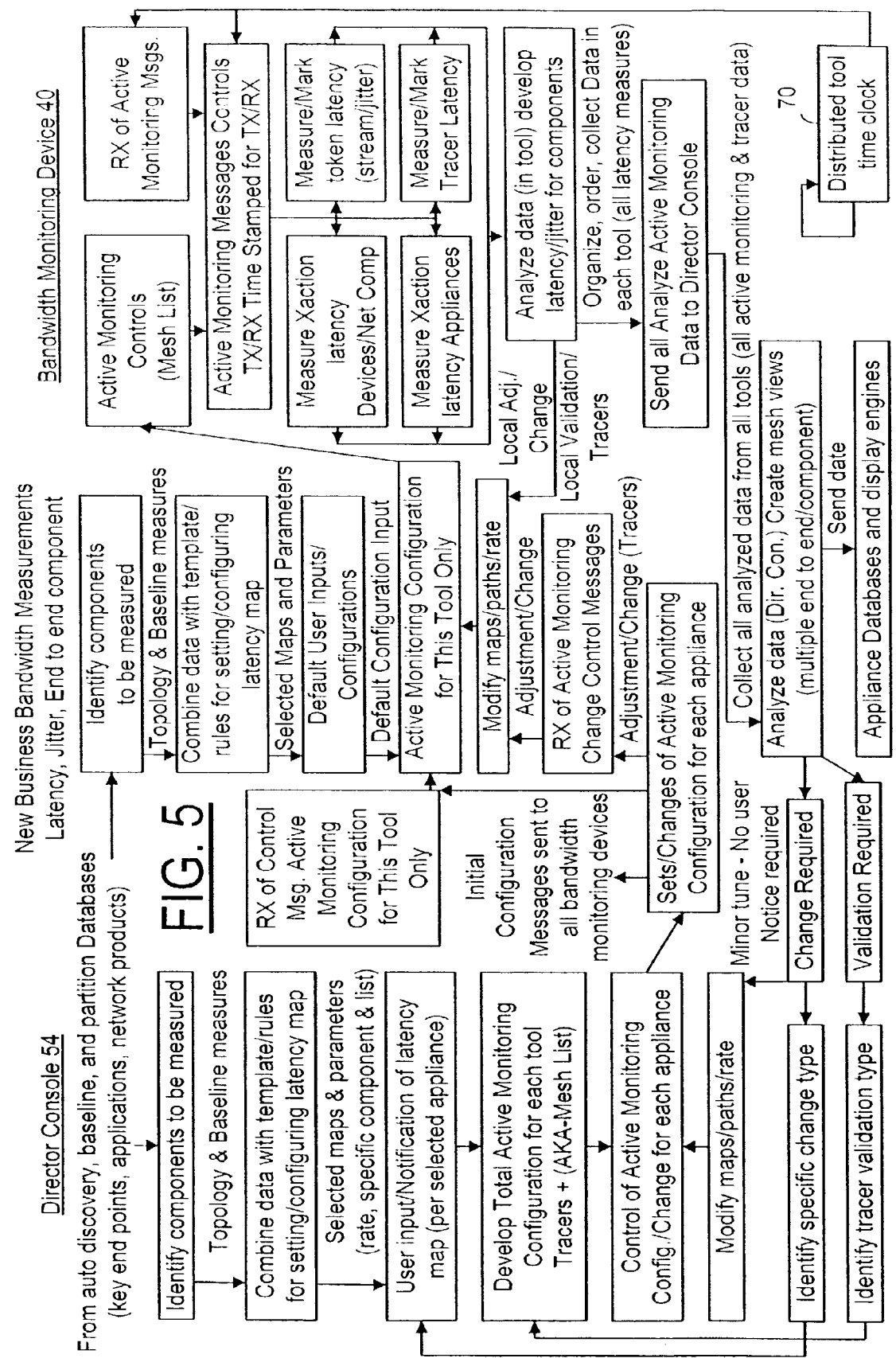
FIG. 5 is a flow chart showing how new business bandwidth measurements, including latency jitter and end-to-end component measurements are made according to the present invention.
Figure 6:
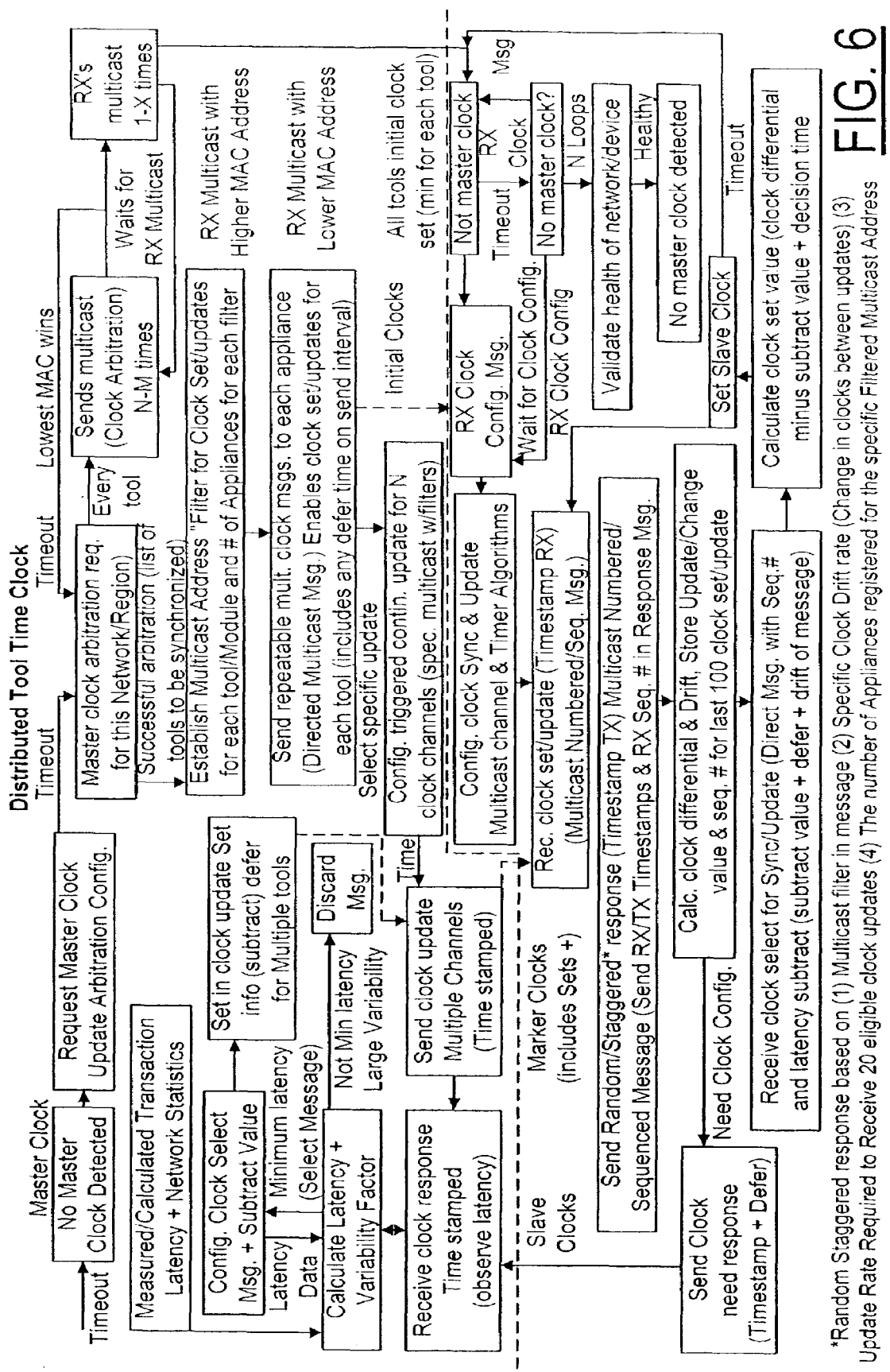
FIG. 6 is a flow chart illustrating how the distributed tool time clock is implemented.

For the methods according to the present invention to be implemented, in addition to the various types of bandwidth monitoring devices, the present invention further includes one or more director consoles 54 which pool and further analyze the bandwidth data associated with the bandwidth monitoring devices. It should be noted that FIG. 1 is a typical deployment associated with the methodologies according to the present invention. Limitless other variations can be contemplated. The underlying concept however is for the bandwidth monitoring devices to be associated at locations where communications from one network environment to another is desired to be monitored, such as between a WAN of an internet service provider and an edge router interfaced to a building router associated with an office building and the like. As seen in FIG. 4, each bandwidth monitoring device 40 includes a bandwidth interconnecting module 41 as shown in FIG. 2 and a master control module 43 as shown in FIG. 3. The master control module can communicate with one or more bandwidth interconnecting modules via backplane bus 45.

The present invention provides a process that identifies how to measure business bandwidth performance and in particular, to determine business bandwidth latencies and the rate of change of such latency known as latency jitter through observations that are continuously made in order to determine multiple end-to-end paths for packets traversing from a source to a destination, as well as individual components that make up such paths and which may therefore affect latency and latency jitter.

In order to determine such latency and jitter concerning business bandwidth, it is necessary that the present invention be implemented through a distribution of bandwidth monitoring devices 40, wherein real-time time stamping is performed. Details of the bandwidth monitoring device, including the bandwidth interconnecting module 41 and the master control module 43 are shown in FIGS. 2 and 3 respectively. Through use of these multiple physical tools the task of interacting with key components in the network for measuring transaction latency from each bandwidth monitoring device to each key component is accomplished. These measurements are performed by collecting information from the bandwidth monitoring devices through synchronized time-stamped data and performing an analysis on such data at a director console 54.

FIGS. 5-8 are the overall flow charts which describe the implementation of the method of determining latency and latency jitter with respect to received bandwidth over a network topology such as that shown in FIG. 1. These flow charts use the hardware shown in FIGS. 1, 2, 3 and 4 concerning the bandwidth monitoring device 40 and the director console 54. Details concerning the architecture of the director console 54 are presented in FIGS. 9-16 with specific modules associated with latency and latency jitter measurements identified by the letter "LJ". Furthermore, the flow of information with respect to the bandwidth monitoring device 40, including the bandwidth interconnection module 41 and the master control module 43, as well as the director console 54 are shown by flow lines containing numbers which sequentially represent the steps for performing the tasks and subtasks related to latency and latency jitter measurements according to the present invention.

Referring again to the flow chart shown in FIGS. 5-8, FIG. 5 is particularly directed to the steps for performing new business bandwidth measurements, including latency, latency jitter and end-to-end component measurements. The flow chart shows the steps for performing such measurements. The distributed tool time clock module 70 is further described in FIG. 6 with respect to the steps for obtaining distributed tool time clock measurements.

Figure 7:
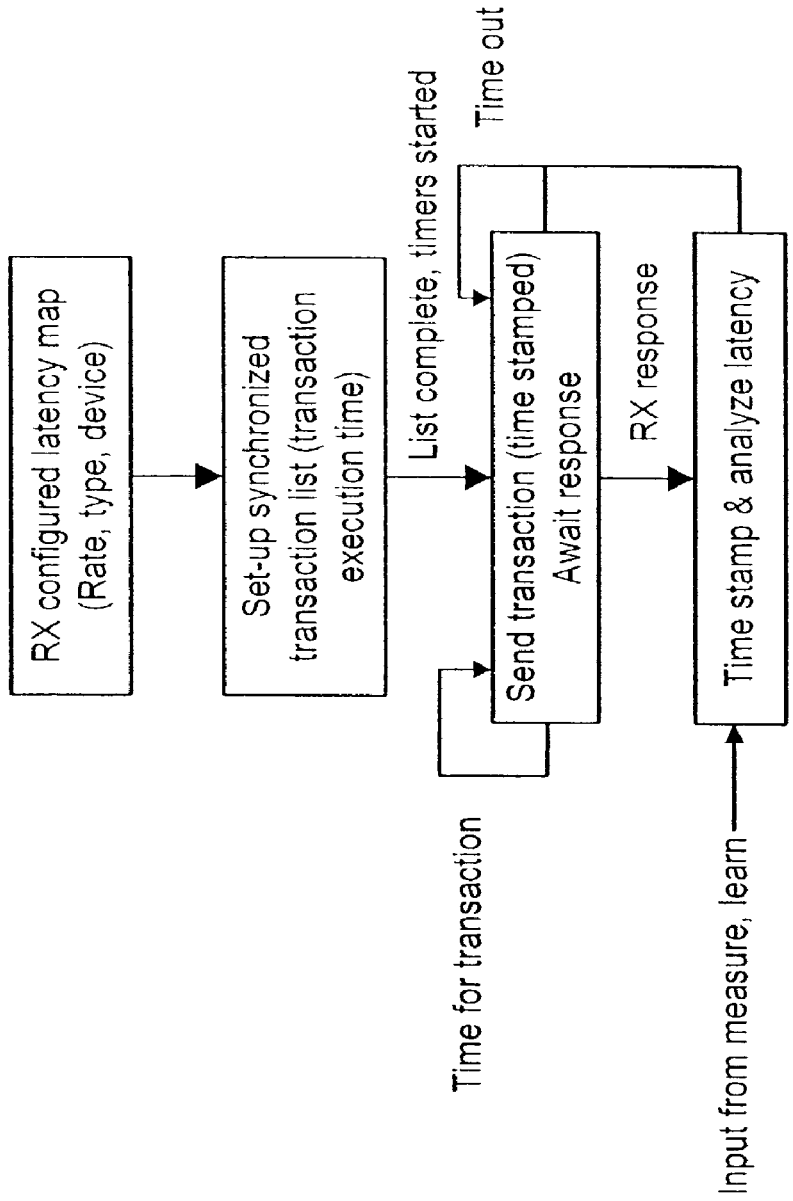
FIG. 7 is a flow chart showing how measured transaction latency is measured.
Figure 8:
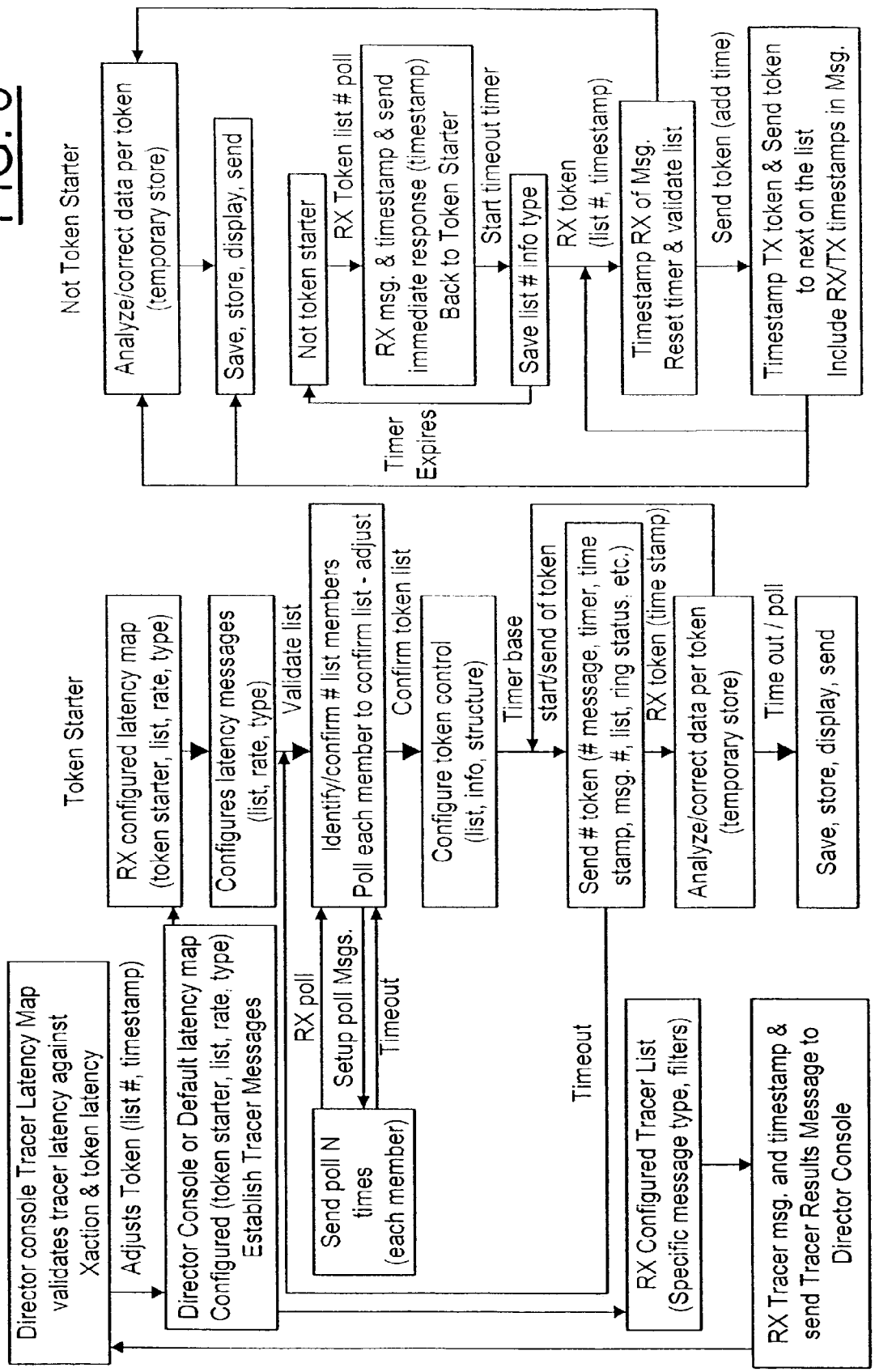
FIG. 8 is a flow chart showing how token latency and token jitter are measured.
Figure 9:
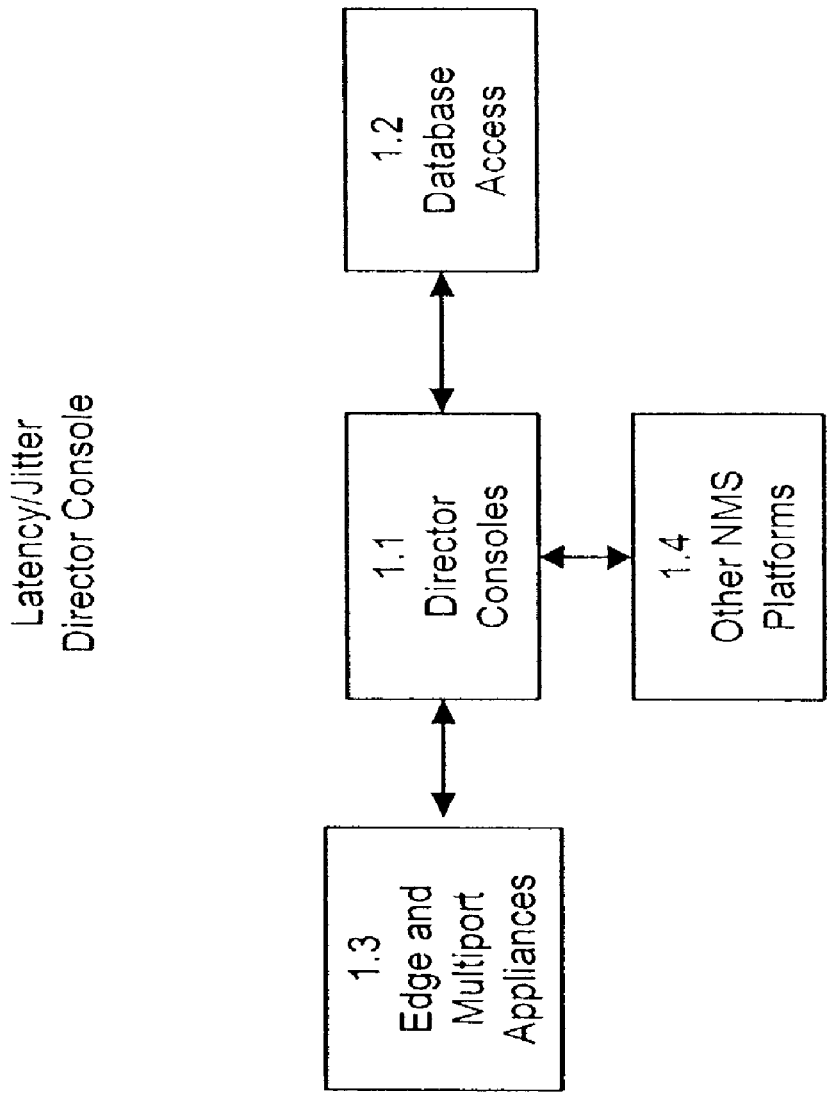
FIG. 9 is a high level block diagram of the director console according to the present invention.
Figure 10:
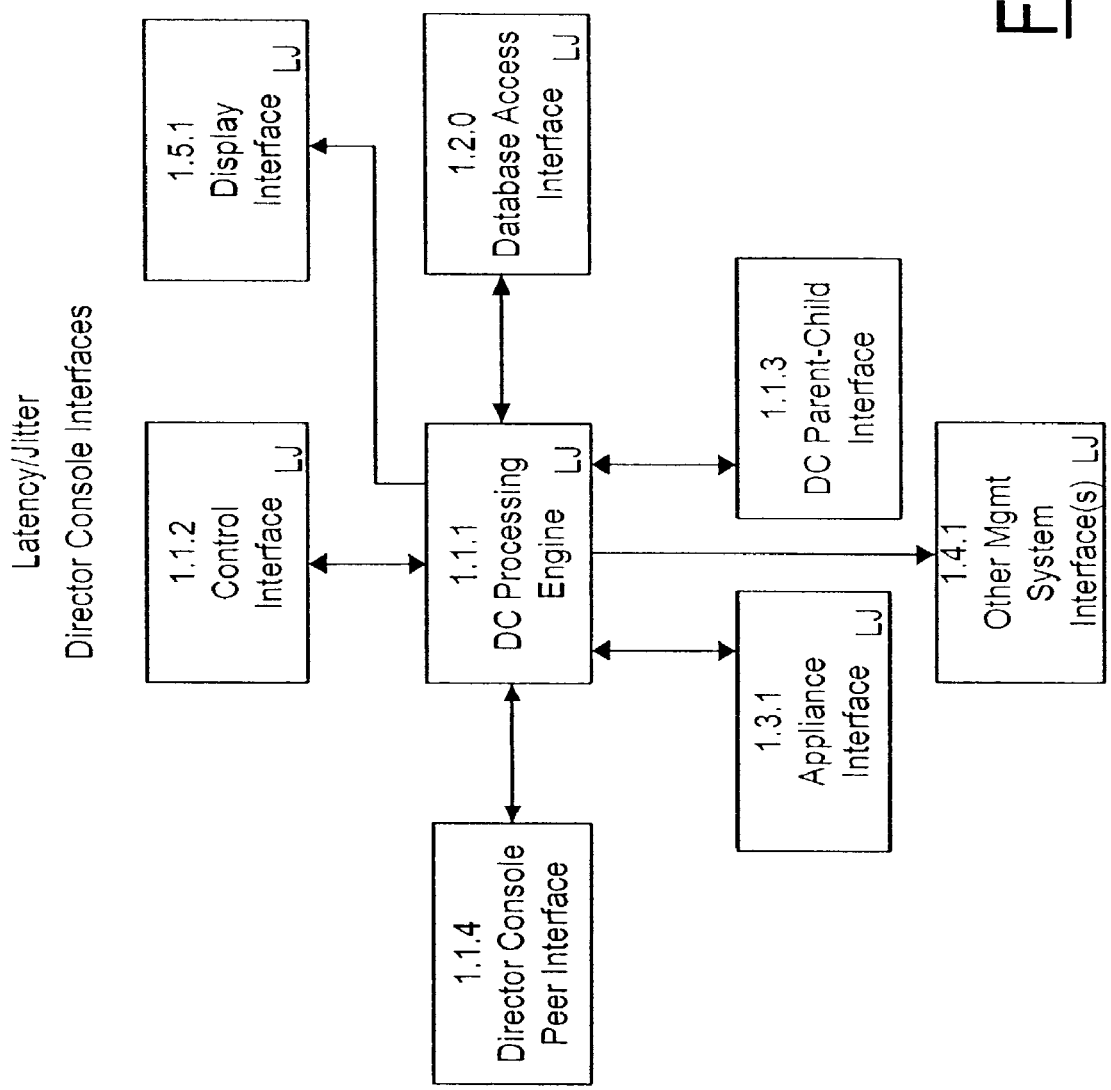
FIG. 10 is a block diagram of the director console interfaces with blocks used for determination of latency and latency jitter identified with the lettering LJ.
Figure 11:
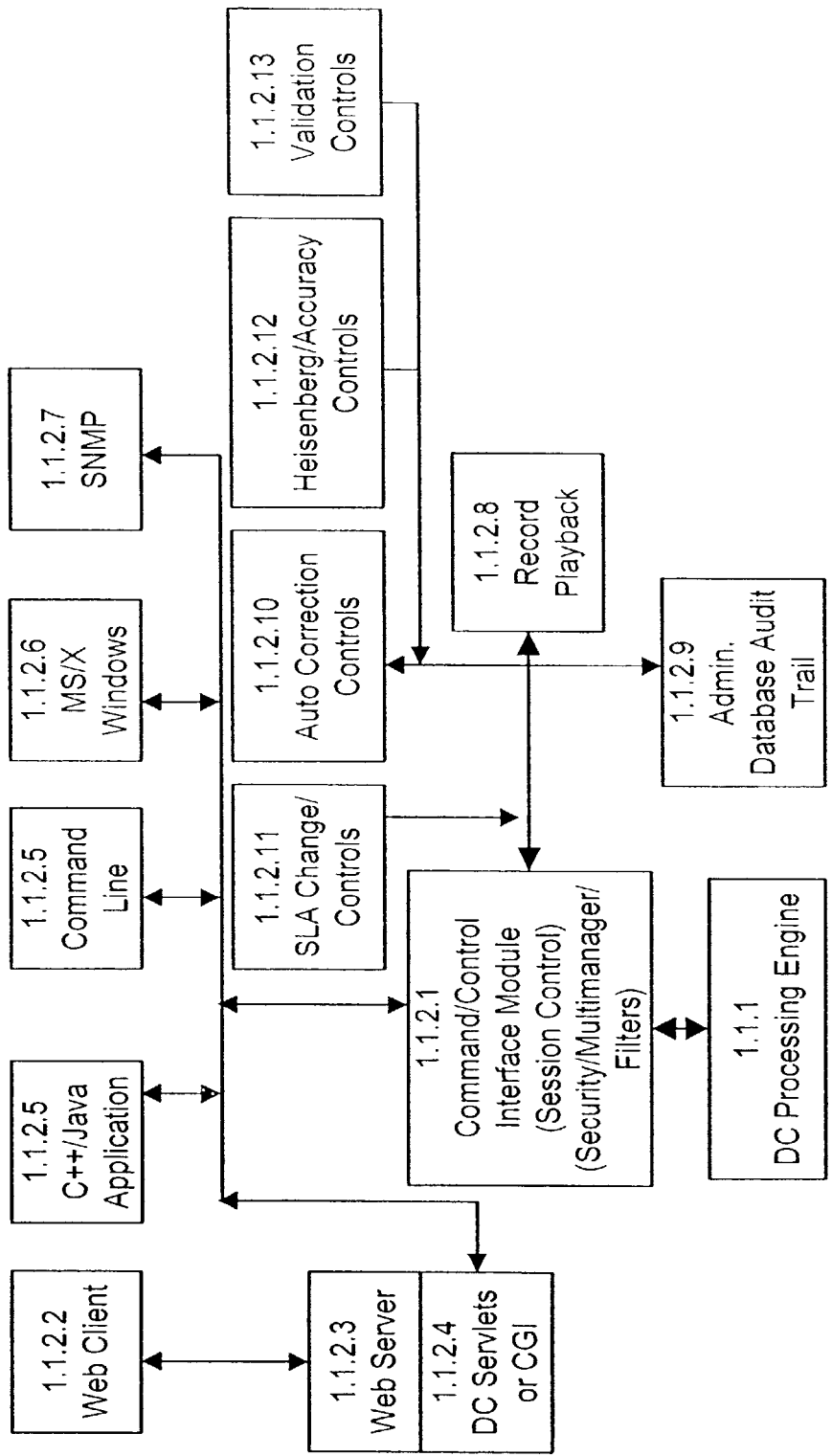
FIG. 11 is a block diagram of the director console control interface module.
Figure 12:
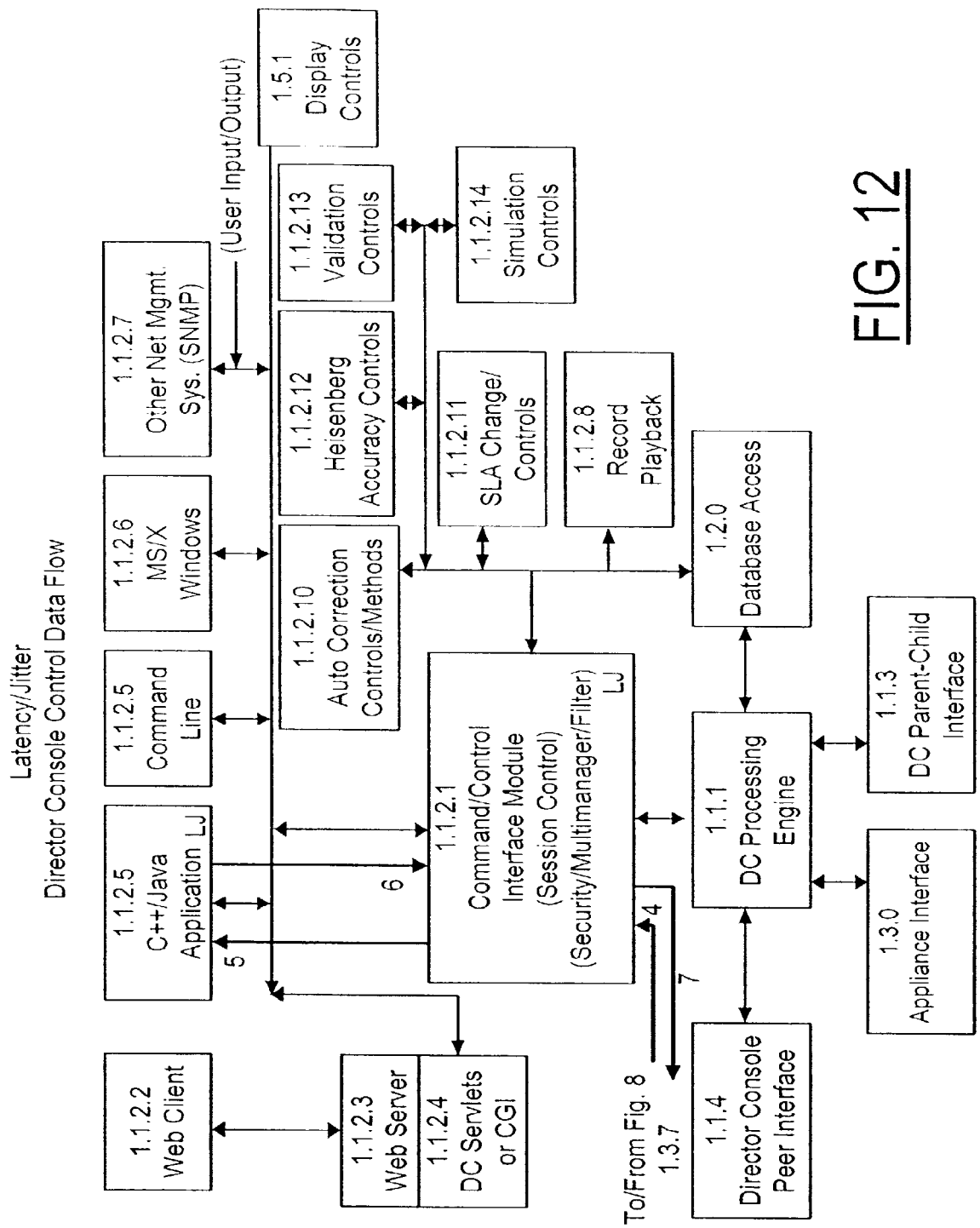
FIG. 12 is a block diagram of the director console control data flow with modules associated with determination of latency and latency jitter identified with the lettering LJ.
Figure 13:
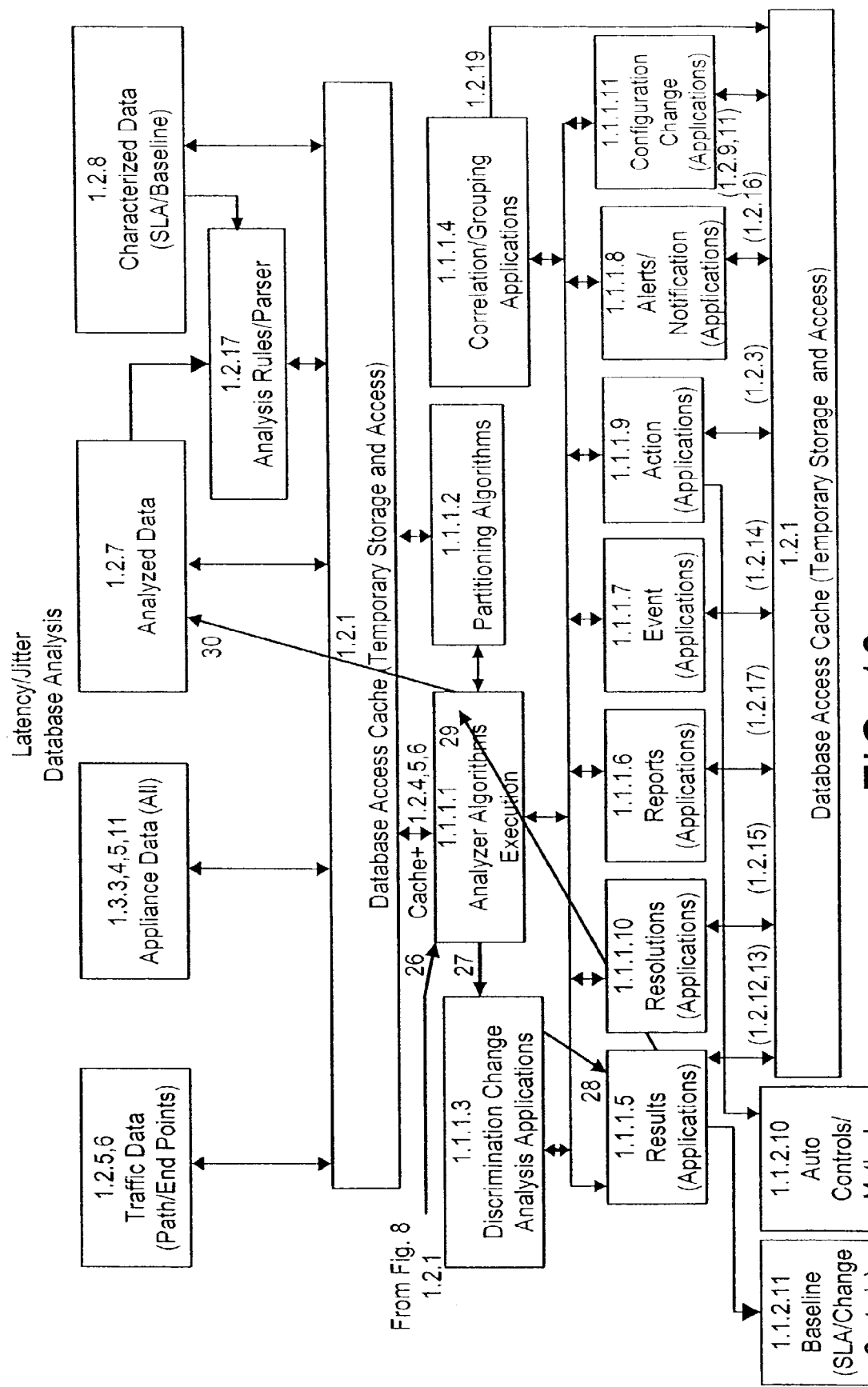
FIG. 13 is a block diagram of the database analysis with modules associated with latency and latency jitter identified with the lettering LJ.
Figure 14:
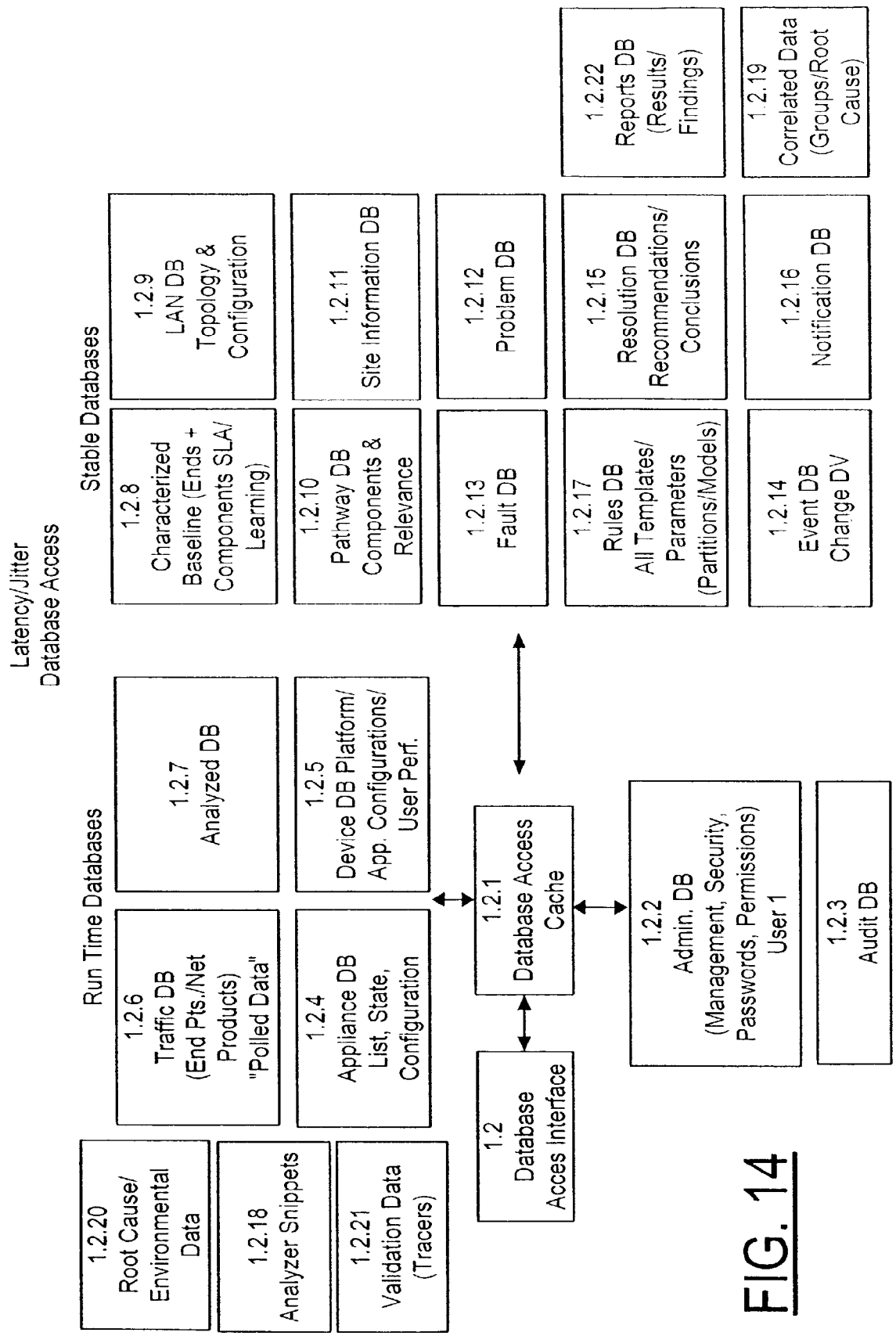
FIG. 14 is a block diagram of database access associated with latency and latency jitter measurements.
Figure 15:
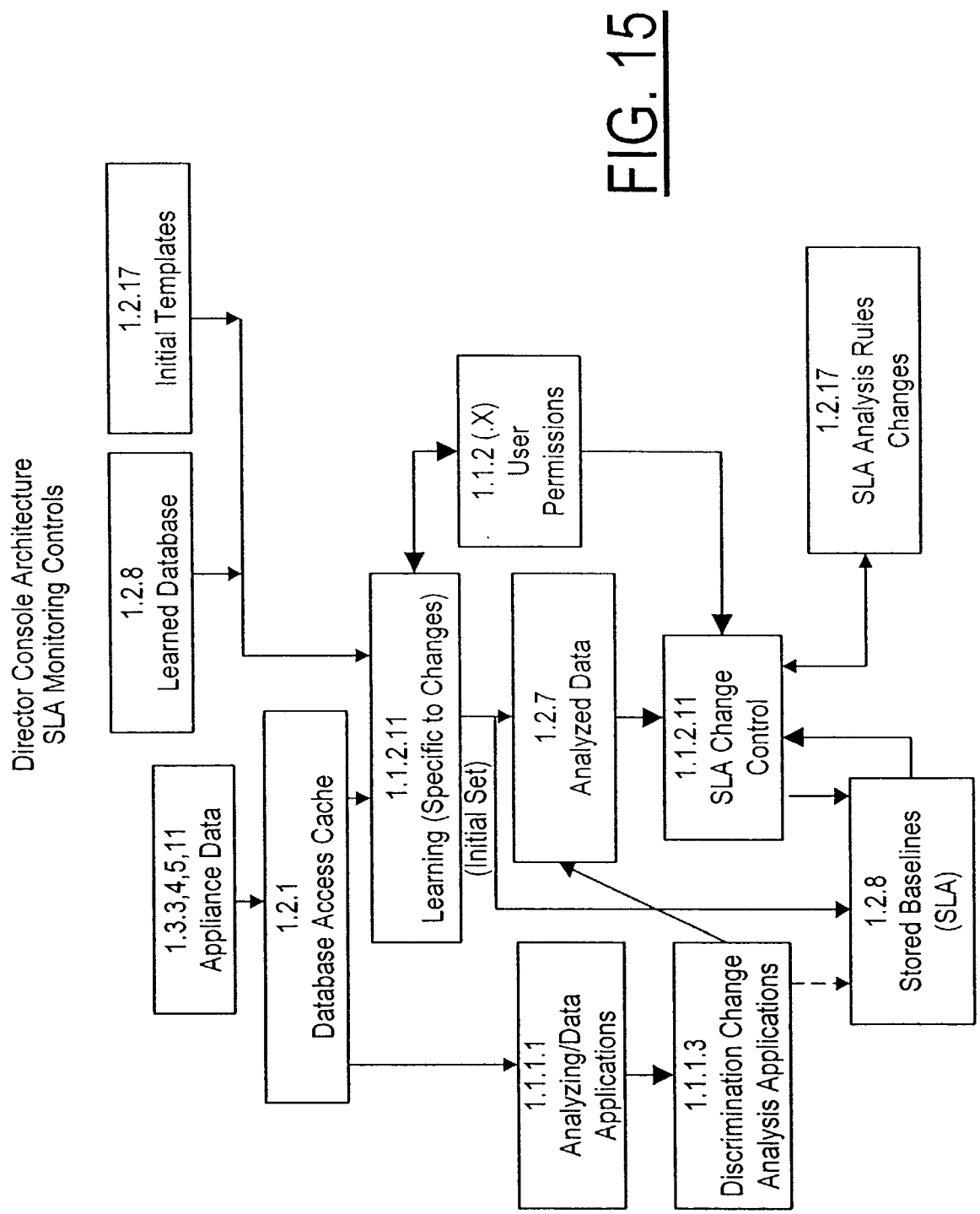
FIG. 15 is an overall block diagram of the director console architecture for service level agreement monitoring controls.
Figure 16:
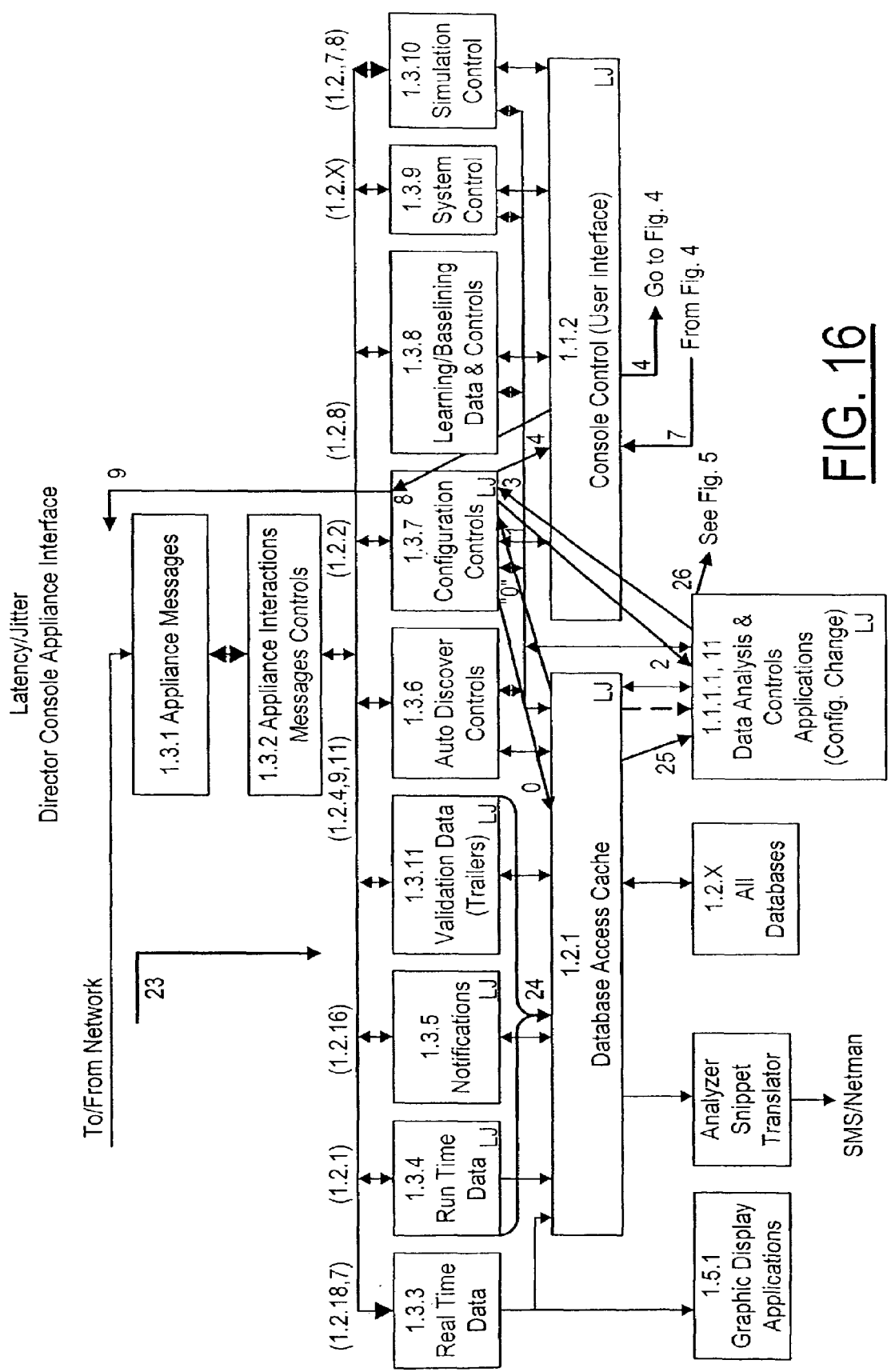
FIG. 16 is a block diagram of the director console appliance interface with modules associated with latency and latency jitter identified with the lettering LJ.

FIG. 7 is a flow chart with respect to measurements of transaction latency while FIG. 8 is a flow chart of the measurement process for token latency and jitter. With respect to details concerning autolearning and autobaselining, cross-reference is made to applicant's co-pending application entitled "Method for Automatically Baselining Business Bandwidth" (attorney docket number 402-127.2-1) filed on even date hereof.

Overall, the present invention has a distributed set of bandwidth monitoring devices which automatically identify key components to be measured based upon accurate real-time autolearning and autobaselining modules with respect to key users and applications which are deemed to be important by the user. Such information can be configured by the user.

The present invention further provides the ability to deploy these distributed tools at key locations in the network such as those shown in FIG. 1. The ability for the tools to interact with each other, coupled with the component measurements allows the overall system to generate latency "maps" which are a list of devices, type of latency measurements, the accuracy and the rate thereof are described in FIG. 5.

Through this information, the system can configure and autotune the distributed tools for specific path measurements which thereby enables critical end-to-end and component views to be developed such as those set forth in FIG. 8.

The use of virtual token ring technology on these specified paths allows stream-based messages to circle a virtual ring by enabling component to component stream latency and jitter measurements. See FIG. 8 for additional details concerning such virtual token methodology.

Furthermore, the present invention provides the ability to use and configure different message types such as unicast, multicast, COS, POS, RSVP, which thereby allows for measuring variations in latency due to message type.

Time Clock Synchronization

The present invention, through its distributed tool time clock, is able to accurately synchronize these clocks coupled with the above virtual token, and allows for highly accurate latency and jitter measurements to be made for specific paths and specific components. Furthermore, the present invention provides the ability to continually calibrate and synchronize the distributed clocks based upon transaction response time and other observed or monitored data. See FIG. 6 for additional details concerning the distributed time clock.

Thus the present invention provides that all latency measurements with respect to the network can be accurately time stamped. By so doing, the collection analysis and correlation of multiple transactions and (virtual token) stream latency measurements are made. The analysis output forms a complete end-to-end/component latency and jitter measurement (also known as Mesh). Furthermore, the ability to store time stamps for specific application messages as they are observed passing through the bandwidth monitoring devices, allows for the measuring "sense" to automatically validate (and calibrate/tune measurements) the latency measurement results. It should be pointed out that user messages are tagged as tracers as shown in the figures. This validation is accomplished by selecting specific message types to be traced and collecting/analyzing tracer message time stamps, and comparing them against Mesh measurements.

The Mesh measurements are the ability to use the Mesh tracer comparison to modify the Mesh token path (rate, specific information) so as to more accurately measure latency which allows a closed-loop tuning process for the Mesh measurements.

Figure 3A:
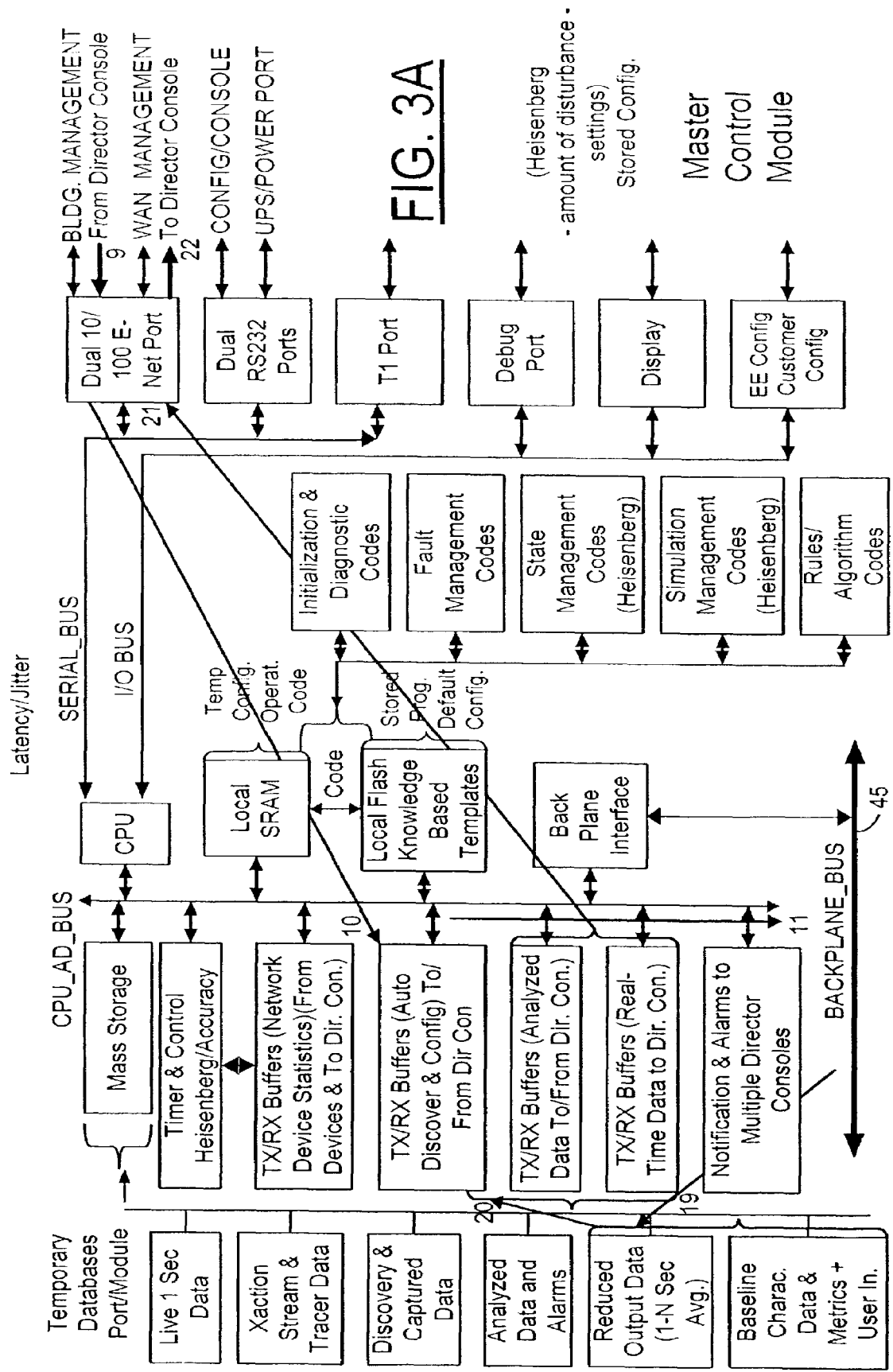

FIGS. 5-8 represent an operational description of how the measurement components and synchronization methods interact with each other to form this new business bandwidth (multiple end-to-end, component to component) latency and latency jitter measurements. Further details concerning the flow paths shown in FIGS. 5-8 are presented in FIG. 2 for the flow paths shown therein, FIG. 3 for the flow paths shown therein, and FIG. 9 with respect to the director console. Further details concerning the distributed time clock and latency/jitter measurements are presented in FIGS. 9-16 and also in FIGS. 2A and 3A.

In Summary, the methodology according to the present invention provides a new business bandwidth measurement system that measures on a continuous and simultaneous basis, multiple end-to-end and component latency and latency jitter (also known as Mesh). The components of the business bandwidth Mesh sense include the ability to automatically identify specific points in the Mesh (end nodes, servers, tools, network products) that are critical points for observation such as high usage, important services, specific funnel points/bottleneck locations; the ability to automatically develop a latency map (list and operational state) for each latency measurement, thereby allowing for user input so as to tune the latency map; the ability to accurately synchronize multiple latency measurements and to accurately time-stamp these measurements, thereby enabling accurate remote collection and data analysis; wherein the new latency/jitter measurements based on both virtual token ring technology and synchronized clocks and time stamps. Such measurements allow stream data types (such as voice/video/UDP) to be measured accurately for critical metrics such as latency, latency jitter verses "burst load".

Furthermore, the Mesh sense provide for the ability to collect latency measurements from multiple bandwidth measuring devices and to create a real-time Mesh view of latency and latency jitter throughout the network. It is also able to validate latency measurements by identifying application message types to be used as tracers in the Mesh; by accurately time stamping tracer messages passing through bandwidth measuring devices; and by collecting and analyzing tracer messages by a centralized validation module such as located in the director console. Furthermore, the Mesh sense components provide for the ability to continually observe change in latency which would require recommendation changes in the latency map, as well as the addition of specific points for latency measurements and the latency rate for more accuracy.

Having described the invention, what is claimed is:

1. A method of measuring system latency and latency jitter regarding packets of information from sources to destinations, comprising:

1) as the packets of information pass through a plurality of locations formed by components of a network, said locations between sources and destinations of said packets, generating time-stamps at said locations distinct from said packets of information, each time-stamp identifying the packet of information, including time-stamp information based on a real-time clock set to a universal standard; and
   2) analyzing at each of the said plurality of locations the time-stamps generated at the plurality of locations in order to determine component latency and latency jitter as said packets traverse from sources to destinations; and
   3) applying said analysis of the time-stamps for a plurality of sources and a plurality of destinations on a real-time basis so as to determine a real-time multiple end-to-end latency and latency jitter representing a real-time mesh view of latency and latency jitter regarding the network.

2. A method of measuring system latency and latency jitter regarding packets of information from sources to destinations according to claim 1, wherein only packets of information of a particular type or types cause time-stamps to be generated at said plurality of locations.

3. A method of measuring system latency and latency jitter regarding packets of information from sources to destinations according to claim 1, wherein tracer packets are generated and time-stamped by a real-time clock set to a universal standard when the tracer packets are transmitted by the source of said tracer packets and wherein the tracer packets are further time-stamped at said plurality of locations by a real-time clock set to said universal standard as these tracer packets traverse the network.

4. A method of measuring system latency and latency jitter regarding packets of information from sources to destinations according to claim 3, wherein the tracer packets are an inserted packet pair that frames at the beginning and end a stream of traffic representing actual network activity.

5. A method of measuring system latency and latency jitter regarding packets of information from sources to destinations according to claim 1, wherein the latency map can be tuned by a user based upon the latency measurements.

6. A method of measuring system latency and latency jitter regarding packets of information from sources to destinations according to claim 1, wherein specific points in the network are identified as of higher priority and are locations where said time-stamps are generated.

7. A system for measuring system latency regarding packets of information from sources to destinations, comprising:
  1) means for generating time-stamps at a plurality of locations formed by components of a network, said location between sources and destinations of packets as the packets of information pass through said plurality of locations, said time-stamps distinct from said packets of information, wherein each time-stamp identifies the packet of information passing through the location, including time-stamp information based on a real-time clock set to a universal standard; and
  2) means for analyzing at each of the plurality of locations the time-stamps generated at the plurality of locations in order to determine component latency and latency jitter as said packets traverse from sources to destinations; and
  3) means for applying said means for analyzing of the time-stamps for a plurality of sources and a plurality of destinations on a real-time basis so as to determine a real-time multiple end-to-end latency and latency jitter representing a real-time mesh view of latency and latency jitter regarding the network.

8. The system of claim 7, wherein said means for generating time-stamps generates said time-stamps when packets of information of a particular type or types pass through said plurality of locations.

9. The system of claim 7, further comprising means for generating tracer packets that are time-stamped by a real-time clock set to a universal standard when the tracer packets are transmitted by the sources of said tracer packets and wherein the tracer packets are further time-stamped at said plurality of locations by a real-time clock set to said universal standard as these tracer packets traverse the network.

* * * * *

UNITED STATES PATENT AND TRADEMARK OFFICE
CERTIFICATE OF CORRECTION

PATENT NO. : 7,260,627 B2  
APPLICATION NO. : 10/222211  
DATED : August 21, 2007  
INVENTOR(S) : Kryskow, Jr. et al.

It is certified that error appears in the above-identified patent and that said Letters Patent is hereby corrected as shown below:

At column 1, line 14, please insert --§-- before "119(e)".

At column 1, line 24, please insert --.-- after the word "same".

At column 1, line 25, please remove "10/22,193" and replace with --10/222,193--.

At column 1, line 29, please remove "10/22,211" and replace with --10/222,211--.

At column 2, line 12, please remove ")" after the word "traffic".

At column 2, line 37, please remove the word "distributed" and replace with the word --distributes--.

Signed and Sealed this

Fourth Day of December, 2007

JON W. DUDAS  
*Director of the United States Patent and Trademark Office*